United States Patent
Kotwicki et al.

(10) Patent No.: US 10,253,706 B2
(45) Date of Patent: Apr. 9, 2019

(54) AIR CHARGE ESTIMATION FOR USE IN ENGINE CONTROL

(71) Applicant: Tula Technology, Inc., San Jose, CA (US)

(72) Inventors: Allan J. Kotwicki, Williamsburg, MI (US); Joel D. Van Ess, Campbell, CA (US); Mark A. Wilcutts, Berkeley, CA (US)

(73) Assignee: Tula Technology, Inc., San Jose, CA (US)

( * ) Notice: Subject to any disclaimer, the term of this patent is extended or adjusted under 35 U.S.C. 154(b) by 88 days.

(21) Appl. No.: 15/628,309

(22) Filed: Jun. 20, 2017

(65) Prior Publication Data

US 2017/0370310 A1    Dec. 28, 2017

Related U.S. Application Data

(63) Continuation-in-part of application No. 14/919,385, filed on Oct. 21, 2015, now Pat. No. 9,835,522.
(Continued)

(51) Int. Cl.
*F02D 41/00* (2006.01)
*F02D 17/02* (2006.01)
(Continued)

(52) U.S. Cl.
CPC ......... *F02D 41/0087* (2013.01); *F02D 13/06* (2013.01); *F02D 17/02* (2013.01);
(Continued)

(58) Field of Classification Search
CPC .... F02D 41/0087; F02D 13/06; F02D 41/182; F02D 17/02; F02D 41/1402;
(Continued)

(56) References Cited

U.S. PATENT DOCUMENTS

| 4,434,767 A | 3/1984 | Kohama et al. |
| 4,489,695 A | 12/1984 | Kohama et al. |

(Continued)

FOREIGN PATENT DOCUMENTS

| WO | WO 2010/006311 | 1/2010 |
| WO | WO 2011/085383 | 7/2011 |

OTHER PUBLICATIONS

Shost et al., U.S. Appl. No. 15/171,931, filed Jun. 2, 2016.
(Continued)

*Primary Examiner* — Joseph Dallo
(74) *Attorney, Agent, or Firm* — Beyer Law Group LLP

(57) ABSTRACT

Methods, devices, estimators, controllers and algorithms are described for estimating working chamber air charge during engine operations. The described approaches and devices are well suited for use in dynamic firing level modulation controlled engines. Manifold pressure is estimated for a time corresponding to an induction event associated with a selected working cycle. The manifold pressure estimate accounts for impacts from one or more intervening potential induction events that will occur between the time that the manifold pressure is estimated and the time that the induction event associated with the selected working cycle occurs. The estimated manifold pressure is used in the estimation of the air charge for the selected working cycle. The described approach may be used to individually calculate the air charge for each induction event at any time that the engine is operating in a mode that can benefit from the individual cylinder air charge estimations.

42 Claims, 8 Drawing Sheets

Related U.S. Application Data

(60) Provisional application No. 62/362,177, filed on Jul. 14, 2016, provisional application No. 62/353,218, filed on Jun. 22, 2016.

(51) Int. Cl.
  *F02D 41/14* (2006.01)
  *F02P 5/15* (2006.01)
  *F02D 41/18* (2006.01)
  *F02D 13/06* (2006.01)

(52) U.S. Cl.
  CPC ....... *F02D 41/1402* (2013.01); *F02D 41/182* (2013.01); *F02P 5/1512* (2013.01); *F02D 41/1401* (2013.01); *F02D 2041/1436* (2013.01); *F02D 2200/0402* (2013.01); *F02D 2200/0408* (2013.01); *Y02T 10/18* (2013.01)

(58) Field of Classification Search
  CPC ......... F02D 41/1401; F02D 2200/0402; F02D 2041/1436; F02D 2200/0408; F02P 5/1512
  See application file for complete search history.

(56) References Cited

U.S. PATENT DOCUMENTS

| | | |
|---|---|---|
| 4,509,488 A | 4/1985 | Forster et al. |
| 5,377,631 A | 1/1995 | Schechter |
| 5,490,486 A | 2/1996 | Diggs |
| 5,497,329 A | 3/1996 | Tang |
| 5,915,272 A | 6/1999 | Foley et al. |
| 5,947,095 A | 9/1999 | Kato |
| 6,082,330 A | 7/2000 | Alberter et al. |
| 6,158,411 A | 12/2000 | Morikawa |
| 6,363,316 B1 | 3/2002 | Soliman et al. |
| 6,408,625 B1 | 6/2002 | Woon et al. |
| 6,619,258 B2 | 9/2003 | McKay et al. |
| 6,634,328 B2 | 10/2003 | Russell et al. |
| 6,636,796 B2 | 10/2003 | Kolmanovsky et al. |
| 6,718,822 B2 | 4/2004 | Soliman et al. |
| 6,760,656 B2 | 7/2004 | Matthews et al. |
| 6,805,095 B2 | 10/2004 | Sun et al. |
| 6,876,097 B2 | 4/2005 | Thomas et al. |
| 7,063,062 B2 | 6/2006 | Lewis et al. |
| 7,066,136 B2 | 6/2006 | Ogiso |
| 7,085,647 B1 | 8/2006 | Prucka et al. |
| 7,086,386 B2 | 8/2006 | Doering |
| 7,142,973 B2 | 11/2006 | Ando |
| 7,151,994 B2 | 12/2006 | Fuwa |
| 7,249,584 B2 | 7/2007 | Rozario et al. |
| 7,275,511 B1 | 10/2007 | Wright et al. |
| 7,314,034 B1 | 1/2008 | Waters et al. |
| 7,357,019 B2 | 4/2008 | McDonald et al. |
| 7,503,312 B2 | 3/2009 | Surnilla et al. |
| 7,577,511 B1 | 8/2009 | Tripathi et al. |
| 7,762,237 B2 | 7/2010 | Gibson et al. |
| 7,900,509 B2 | 3/2011 | Feldkamp et al. |
| 7,908,913 B2 | 3/2011 | Cinpinski et al. |
| 7,921,709 B2 | 4/2011 | Doering et al. |
| 7,930,087 B2 | 4/2011 | Gibson et al. |
| 8,099,224 B2 | 1/2012 | Tripathi et al. |
| 8,103,433 B2 | 1/2012 | Hartmann et al. |
| 8,181,508 B2 | 3/2012 | Cinpinski et al. |
| 8,251,044 B2 | 8/2012 | Russell et al. |
| 8,286,471 B2 | 10/2012 | Doering et al. |
| 8,301,362 B2 | 10/2012 | Buslepp et al. |
| 8,631,688 B1 | 1/2014 | Rayl et al. |
| 8,666,641 B2 | 3/2014 | Rollinger et al. |
| 8,667,835 B2 | 3/2014 | Doering et al. |
| 8,826,891 B2 | 9/2014 | Nishikiori et al. |
| 9,086,020 B2 | 7/2015 | Tripathi et al. |
| 9,175,613 B2 | 11/2015 | Parsels et al. |
| 9,212,610 B2 | 12/2015 | Chen et al. |
| 9,399,963 B2 | 7/2016 | Loucks et al. |
| 9,399,964 B2 | 7/2016 | Younkins et al. |
| 9,494,088 B1 * | 11/2016 | Serrano .................. F02D 17/02 |
| 9,562,470 B2 | 2/2017 | Younkins et al. |
| 9,605,601 B2 * | 3/2017 | Leone ................. F02D 41/0087 |
| 9,835,101 B2 * | 12/2017 | Leone ................. F02D 41/0087 |
| 9,835,522 B2 | 12/2017 | Chen et al. |
| 9,891,137 B2 | 2/2018 | Chen et al. |
| 9,945,313 B2 * | 4/2018 | Kotwicki ............... F02D 41/18 |
| 9,995,652 B1 | 6/2018 | Chen |
| 10,060,368 B2 | 8/2018 | Pirjaberi et al. |
| 10,100,761 B2 * | 10/2018 | Karnik ............... F02D 41/0087 |
| 2005/0199220 A1 | 9/2005 | Osigo |
| 2005/0217620 A1 | 10/2005 | Shindou |
| 2009/0066337 A1 | 3/2009 | Gibson et al. |
| 2010/0031738 A1 | 2/2010 | Feldkamp et al. |
| 2010/0050993 A1 | 3/2010 | Zhao et al. |
| 2010/0126260 A1 | 5/2010 | Bowling et al. |
| 2010/0154738 A1 | 6/2010 | Tsukamoto et al. |
| 2010/0175462 A1 | 7/2010 | Doering et al. |
| 2011/0167900 A1 | 7/2011 | Zanotti et al. |
| 2013/0325290 A1 | 12/2013 | Pierik |
| 2014/0069374 A1 | 3/2014 | Matthews |
| 2014/0069375 A1 | 3/2014 | Matthews et al. |
| 2014/0069376 A1 | 3/2014 | Matthews et al. |
| 2014/0069377 A1 | 3/2014 | Brennan et al. |
| 2014/0251282 A1 * | 9/2014 | Kotwicki ................ F02D 41/18 123/481 |
| 2014/0261309 A1 * | 9/2014 | Chen .................. F02D 41/0082 123/320 |
| 2015/0192080 A1 | 7/2015 | Younkins et al. |
| 2015/0377095 A1 | 12/2015 | Walther et al. |
| 2016/0003168 A1 * | 1/2016 | Leone ..................... F02D 17/02 123/406.47 |
| 2016/0003169 A1 * | 1/2016 | Leone ................. F02D 41/0087 123/481 |
| 2016/0024981 A1 | 1/2016 | Parsels et al. |
| 2016/0061127 A1 | 3/2016 | Chen et al. |
| 2016/0109330 A1 | 4/2016 | Chen et al. |
| 2016/0116371 A1 * | 4/2016 | Chen ................. F02M 35/1038 73/114.37 |
| 2016/0326969 A1 * | 11/2016 | Serrano .................. F02D 17/02 |
| 2017/0101956 A1 | 4/2017 | Younkins et al. |
| 2017/0198651 A1 * | 7/2017 | Leone ................. F02D 41/0087 |
| 2017/0299466 A1 | 10/2017 | Chen et al. |
| 2017/0342920 A1 | 11/2017 | Pirjaberi et al. |
| 2017/0342922 A1 | 11/2017 | Pirjaberi et al. |
| 2017/0370310 A1 * | 12/2017 | Kotwicki .............. F02D 41/182 |
| 2018/0238248 A1 * | 8/2018 | Karnik ................ F02D 41/0087 |

OTHER PUBLICATIONS

International Search Report dated Feb. 23, 2016 from International Application No. PCT/US15/56732.

Written Opinion dated Feb. 23, 2016 from International Application No. PCT/US15/56732.

\* cited by examiner

AIR CHARGE ESTIMATION FOR USE IN ENGINE CONTROL

CROSS-REFERENCE TO RELATED APPLICATIONS

This application is a Continuation-in-Part of U.S. application Ser. No. 14/919,385, filed on Oct. 21, 2015. The present application also claims priority of U.S. Provisional Patent Application Nos. 62/353,218, filed on Jun. 22, 2016, and 62/362,177, filed on Jul. 14, 2016, each of which is incorporated herein by reference in its entirety.

FIELD OF THE INVENTION

The present invention relates generally to estimating air charge in vehicles powered by internal combustion engines.

BACKGROUND

Fuel efficiency of internal combustion engines can be substantially improved by varying the displacement of the engine in response to the demanded torque. Full displacement allows for the full torque to be available when required, yet using a smaller displacement when full torque is not required can significantly reduce pumping losses and improve thermal efficiency. The most common method today of implementing a variable displacement engine is to deactivate a group of cylinders substantially simultaneously. In this approach the intake and exhaust valves associated with the deactivated cylinders are kept closed and no fuel is injected when it is desired to skip a combustion event. For example, an 8-cylinder variable displacement engine may deactivate half of the cylinders (i.e. 4 cylinders) so that it is operating using only the remaining 4 cylinders. Commercially available variable displacement engines available today typically support only two or at most three displacements.

Another engine control approach that varies the effective displacement of an engine is referred to as "skip fire" engine control. In general, skip fire engine control contemplates selectively skipping the firing of certain cylinders during selected firing opportunities. Thus, a particular cylinder may be fired during one engine cycle and then may be skipped during the next engine cycle and then selectively skipped or fired during the next. Skip fire engine operation is distinguished from conventional variable displacement engine control in which a designated set of cylinders are deactivated substantially simultaneously and remain deactivated as long as the engine remains in the same variable displacement mode. Thus, the sequence of specific cylinders' firings will always be the same for each engine cycle during operation in a variable displacement mode (so long as the engine remains in the same displacement mode), whereas that is often not the case during skip fire operation. For example, an 8-cylinder variable displacement engine may deactivate half of the cylinders (i.e. 4 cylinders) so that it is operating using only the remaining 4 cylinders.

In general, skip fire engine operation facilitates finer control of the effective engine displacement than is possible using a conventional variable displacement approach. For example, firing every third cylinder in a 4-cylinder engine would provide an effective displacement of $\frac{1}{3}^{rd}$ of the full engine displacement, which is a fractional displacement that is not obtainable by simply deactivating a set of cylinders. Conceptually, virtually any effective displacement can be obtained using skip fire control, although in practice most implementations restrict operation to a set of available firing fractions, sequences or patterns. The Applicant has filed a number of patents describing various approaches to skip fire control. By way of example, U.S. Pat. Nos. 8,099,224; 8,464,690; 8,651,091; 8,839,766; 8,869,773; 9,020,735; 9,086,020; 9,120,478; 9,175,613; 9,200,575; 9,200,587; 9,291,106; 9,399,964, and others describe a variety of engine controllers that make it practical to operate a wide variety of internal combustion engines in a dynamic skip fire operational mode. Each of these patents is incorporated herein by reference. Many of these patents relate to dynamic skip fire control in which firing decisions regarding whether to skip or fire a particular cylinder during a particular working cycle are made in real time—often just briefly before the working cycle begins and often on an individual cylinder firing opportunity by firing opportunity basis.

In some applications referred to as dynamic multi-level skip fire, individual working cycles that are fired may be purposely operated at different cylinder outputs levels—that is, using purposefully different air charge and corresponding fueling levels. By way of example, U.S. Pat. No. 9,399,964 describes some such approaches. The individual cylinder control concepts used in dynamic skip fire can also be applied to dynamic multi-charge level engine operation in which all cylinders are fired, but individual working cycles are purposely operated at different cylinder output levels. Dynamic skip fire and dynamic multi-charge level engine operation may collectively be considered different types of dynamic firing level modulation engine operation in which the output of each working cycle (e.g., skip/fire, high/low, skip/high/low, etc.) is dynamically determined during operation of the engine, typically on an individual cylinder working cycle by working cycle (firing opportunity by firing opportunity) basis. It should be appreciated that dynamic firing level engine operation is different than conventional variable displacement in which when the engine enters a reduced displacement operational state, a defined set of cylinders are operated in generally the same manner until the engine transitions to a different operational state.

The fuel control system in many engine controllers includes an air charge estimator, such as a MAC (mass air charge) estimator or an APC (air per cylinder) estimator. Conventional air estimation techniques are often not particularly well suited for use in skip fire controlled engines due to the impacts of irregular and/or shifting firing sequences that can occur during skip fire operation. Many prior art air charge estimators utilize a mean or a filtered value of a measured absolute manifold pressure (MAP) in their air charge estimations. Often, use of mean pressures will not accurately predict the cylinder air charge on a firing-by-firing basis because previous MAP values are not necessarily indicative of the future trajectory of the manifold pressure in a skip firing engine. In addition, changes in the position of other airflow control actuators such as throttle and cam phasers taking place after the cylinder air estimate is required for fuel injection amount determination are not accounted for. Fuel injection based on poorly predicted air charges will result in a mixture of rich and lean combustions, causing poor catalytic converter efficiency, and when extreme, loss in torque and efficiency as combustion of the excess fuel in rich-firing cylinders will be completed inside the catalytic converter.

U.S. patent application Ser. No. 13/794,157, U.S. Provisional Patent Application No. 62/068,391 and SAE Technical Paper 2015-01-1717 each describe air charge estimation techniques suitable for use in skip fire engine operation. Each of these references is incorporated herein by reference.

Although such estimators work well in many applications, there are continuing efforts to further improve the air charge estimators and estimation techniques in manners that are well suited for use in skip fire and multi-level engine control schemes.

SUMMARY

To achieve the foregoing and other objects of the invention, methods, devices, estimators, controllers and algorithms are described for estimating working chamber air charge during engine operations. The described approaches and devices are well suited for use in dynamic firing level modulation controlled engines as well as for use in other skip fire and multi-charge level operating modes. In some embodiments, manifold pressure is estimated for a time corresponding to an induction event associated with a selected working cycle. The manifold pressure estimate is arranged to account for impacts from one or more intervening potential induction events that will occur between the time that the manifold pressure is estimated and the time that the induction event associated with the selected working cycle occurs. The estimated manifold pressure may then be used in the estimation of the air charge for the selected working cycle. Such an approach may be used to individually calculate the air charge for each induction event at any time that the engine is operating in a mode that can benefit from the individual cylinder air charge estimations.

The estimated air charge may be used by a fuel charge estimator or other suitable device in the determination of a desired fuel charge for the selected working cycle. The desired fuel charge can then be injected by a fuel injection controller at the appropriate time for the selected working cycle.

The air charge estimate is preferably made as late as possible before the fueling pulse occurs, to accurately account for changing engine operating conditions resulting from dynamically changing torque requests from the engine, so that a target combustion air-fuel ratio is achieved. This late-as-possible time is usually after the corresponding firing decision for the cylinder has been made, but before the corresponding induction event is complete. The firing decision is preferably made at close to the time that the corresponding working cycle begins, but it must be made far enough before the working cycle begins so that there is adequate time to activate and/or deactivate any actuators that are required to deliver (or deny) the air charge required to implement the firing decision (which can take the form of deactivating a corresponding working chamber in the case that the firing decision is to skip the selected working cycle).

In some embodiments, air charge estimation utilizes a then current firing history of the working chamber in which the selected working cycle occurs in the determination the air charge. Similarly, a manifold pressure estimator or other suitable device can utilize the then current firing histories of any other working chambers utilized for intervening induction events in the manifold pressure estimation.

Is some embodiments the state of various actuators and/or parameters that are relevant to the manifold pressure and/or air charge determination expected at the time of the induction event associated with the selected working cycle may be predicted by appropriate predictors and utilized in the manifold pressure and/or air charge estimations. These may include predicting values for parameters such as cam phase, engine speed, manifold temperature, boost level, throttle position, air inlet pressure and temperature, exhaust pressure, etc.

In some embodiments, the estimated manifold pressure corresponds to a manifold pressure that is expected just before or coincident with the closing an intake valve actuated to facilitate the induction event associated with the selected working cycle. By way of example, the estimated manifold pressure may correspond to an expected pressure in the range of zero to forty crank angle degrees before the intake valve closure.

In some embodiments, an initial air charge estimation is made in the range of approximately 180° to 1080° of crank angle rotation prior to the opening of the intake valve actuated to facilitate the induction event associated with the selected working cycle. The initial air charge estimation may be refined by using updated information on actuator position and MAP as time between the estimation and the induction event decreases. A final air charge estimation may be determined at or near the end of the induction event. Depending on the required fuel injection timing either the initial air charge estimate, the final air charge estimate, or some intermediate air charge estimate may be used to help determine the injected fuel mass. This final air charge estimation may be used in conjunction with the injected fuel mass and measurements of exhaust constituents to improve the accuracy of the air charge estimation.

In some embodiments, the air charge estimation is further based in part on whether an exhaust valve that vents the working chamber in which the selected working cycle occurs was actuated in the immediately preceding working cycle in that working chamber. In general, the estimated air charge will be higher when the exhaust valve that vents the working chamber in which the selected working cycle occurs was not actuated in the immediately preceding working cycle in that working chamber relative to what the estimated air charge would have been if, all other factors being equal, the exhaust valve had been actuated in the immediately preceding working cycle.

In some embodiments, estimates of the inflow of air into the intake manifold together with estimates of the outflow of air associated with each induction event are used in the manifold pressure estimation.

In some embodiments, the estimated air charge is determined using a speed density calculation.

The described estimators, controllers, devices, methods and algorithms may be used in conjunction with a wide variety of different engines. The advantages of using the described approach tend to increase as the ratio between intake manifold volume and individual working chamber displacement gets smaller. Low cylinder count engines, such as 2, 3, and 4 cylinder engines, tend to have a smaller intake manifold volume to individual working chamber displacement ratio than high cylinder count engines, such as 6 or 8 cylinder engines. Thus, the present invention is particularly applicable to 2, 3, and 4 cylinder engines. For example, the ratio of intake manifold volume to individual cylinder displacement may be in the range of 15 to 20 for an 8-cylinder engine, while for a 4-cylinder engine it may be less than 10.

BRIEF DESCRIPTION OF THE DRAWINGS

The invention and the advantages thereof, may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION

The present invention relates to methods and systems for improving the accuracy of the air charge estimations used in the control of an internal combustion engine. The described techniques are particularly well suited for use in conjunction with skip-fire and multi-charge level engine control, although they may readily be used in other circumstances as well.

In dynamic skip fire (DSF) and other dynamic firing level modulation engine controllers, firing decisions need to be made in advance of the implementation of the decision. This allows the engine control module (ECM), power train control module (PCM), engine control unit (ECU) or other appropriate engine controller(s) time to prepare various actuators to be placed in their proper condition to implement the fire/no-fire/firing-level decision. The relevant actuators include the cylinder activation/deactivation system, fuel injectors, the ignition coils, etc. required to implement the firing decision. In various described embodiments, an air charge estimator is configured to predict or look ahead in time in order to properly estimate the air charge inducted into a cylinder. Better air charge estimates facilitate more accurate fuel charge injection to meet a target air-fuel ratio, which has the potential to improve both fuel efficiency and emission characteristics.

The described approaches are particularly well suited for use in skip fire and other firing level modulation controlled engines. In some embodiments, the firing decisions, along with a model of the intake manifold, are used to provide a more accurate air charge estimate for each future firing cylinder. Better overall air-fuel ratio regulation and in particular better firing-by-firing air-fuel ratio uniformity may be obtained. Improved air-fuel regulation improves the efficiency of a three-way catalytic converter that may be located in the engine exhaust system, resulting in better regulatory conformance of tailpipe emissions, or alternatively, better cost-optimization of the catalytic converter.

An air charge estimator can use the known values of intake manifold pressure and temperature, cam phase, throttle position and other engine variables at the time the fire/no-fire/fire-level decision is made. It may also use any anticipated changes in actuators such as throttle or cam in the time between the firing decision and intake valve closure (IVC) of the firing cylinder. The air charge estimator also knows whether any intervening firing opportunities will be a skip or a fire. The air charge estimator may then use this information to predict the MAP at a time slightly prior to or coincident with IVC of a firing cylinder. The air charge estimator may provide successively more accurate predictions of the air charge, starting with an initial estimate at the time of the firing decision to a final estimate at or near IVC.

Figure 1:
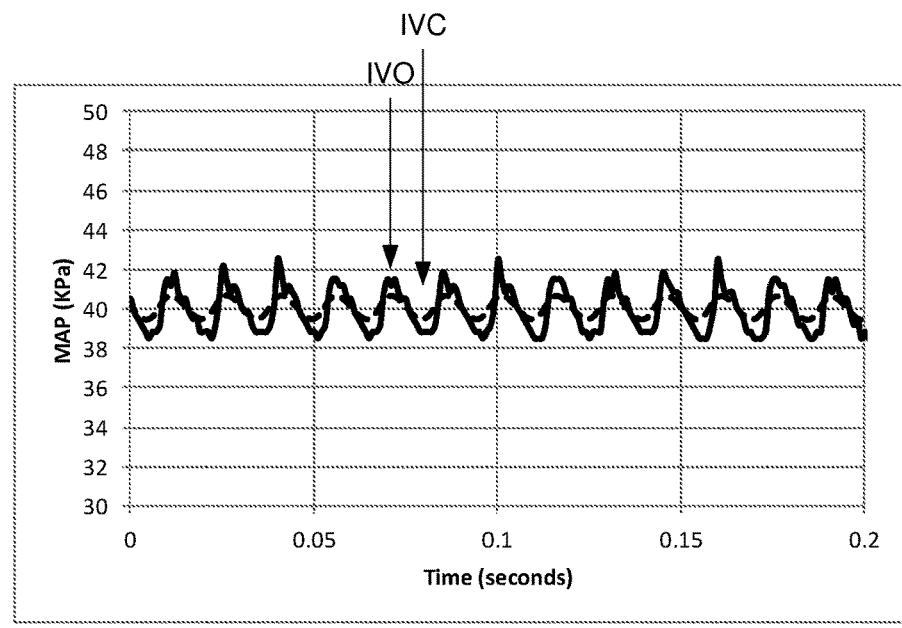
FIG. 1 shows MAP variation with all-cylinder firing.

FIG. 1 shows the manifold absolute pressure (MAP) variations occurring in an exemplary engine running at steady-state with all cylinders firing. In FIG. 1 the solid curve is the measured MAP and the dashed curve is an estimated MAP derived from a model of intake manifold dynamics. The average MAP is approximately 40 kPa and the variation in the MAP is less than 4 kPa. Maximum MAP occurs at intake valve opening (IVO) as a cylinder starts its working cycle. Minimum MAP occurs at or near intake valve closure (IVC). In all-cylinder operation, the values of MAP at IVO and IVC are relatively constant from firing to firing, so regardless of the angular location of the air estimation algorithm execution, the algorithm can be calibrated properly, and the MAC estimate associated with each successive cylinder firing can be calculated relatively accurately based on previous MAP information.

Figure 2:
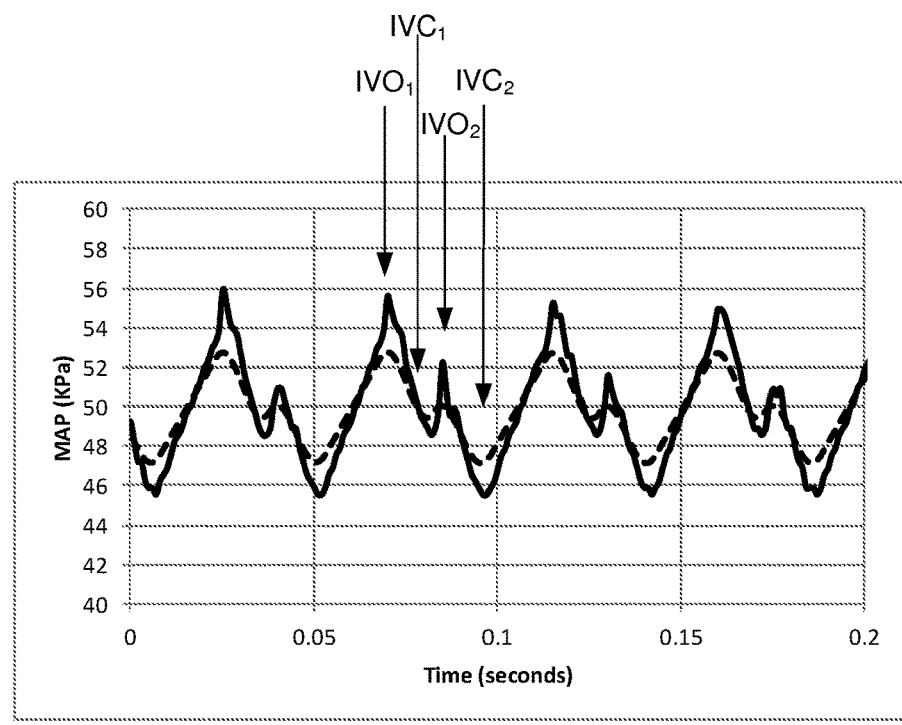
FIG. 2 shows MAP variation with a fire-fire-skip (repeating) firing sequence.

The situation is different for a skip-fired controlled engine where not every working cycle results in a cylinder firing— and particularly when firing sequences are used that do not always have the same number of skips that occur before every firing. FIG. 2 shows the MAP versus time for an engine operating at steady state in a fire-fire-skip pattern, which corresponds to firing fraction of ⅔ with most evenly spaced firings. As in FIG. 1 the solid line is measured MAP and the dashed line is modeled MAP. The situation here is very different than the all cylinder firing case depicted in FIG. 1. The manifold pressure varies by about 10 kPa, more than twice the variation observed in the all cylinder firing case. Also, the MAP at or near IVC varies significantly between successive engine cycles. The difference in the measured MAP between $IVC_1$ and $IVC_2$ is about 3 kPa, approximately 3× larger than the variation seen in all cylinder operation. The most important time window influencing cylinder MAC is a time window around closing of the intake valve (IVC) as manifold conditions around this time largely determine the amount of manifold gas inducted into a cylinder. Before this time changing gas pressures are equalizing between intake manifold and cylinder, and after this time the intake valve is closed and manifold conditions become no longer relevant to the trapped air mass in the cylinder.

Dynamic skip fire operation most commonly includes cylinder deactivation whereby intake and exhaust valves are kept closed during the nominal gas exchange phases of the 4-stroke engine cycle. Performing cylinder deactivation requires the engine controller to control power driver outputs that actuate the cylinder deactivation elements. For cam operated valves, cylinder deactivation may be realized by actuating solenoids that operate hydraulic oil control valves, which allow the valve lifters to either remain rigid (a fired cylinder) or collapsed (a skipped cylinder). Such a system may be referred to as a "lost-motion" deactivation system. Cylinder deactivation can also be achieved using mechanisms other than cams. For example, electromechanical actuators (e.g. solenoids) may be used to control the intake and/or the exhaust valves.

As described in U.S. patent application Ser. No. 14/812,370, which is incorporated herein by reference, there is a time lag between a fire/no-fire decision and implementation of that decision. Depending on the mechanism used to deactivate the cylinders and the number of cylinders in the engine, this delay can be in the range of 2 to 9 firing opportunities. This delay can be expressed in terms of degrees of crank angle and may, for example, be between 180° and 1080° of crankshaft rotation depending on the control algorithm and deactivation system used. Therefore, if air charge is calculated in the engine controller using inputs measured at the time of the firing decision, the air charge calculation may be inaccurate.

The time of decision for valve actuation is typically in advance of the time that an air estimate is needed for purposes of calculating correct fuel injection parameters to achieve a desired cylinder air-to-fuel ratio. Based on intake valve actuation of other cylinders in the engine, the intake manifold pressure may decrease or increase from its value at the time of the firing decision. These intake manifold pressure change can be modeled and that model used to help predict the air charge. More specifically, at the time that any particular firing decision is made, the earlier firing decisions for any other cylinders that can potentially have induction events between the particular firing decision and its associated induction event will be known. Thus, regardless of the time that corresponding air charge is determined, the model can account for any intervening induction events that will (or won't) occur before the induction event corresponding to that particular firing decision is made. Considering the impacts of such intervening induction events allows the future trajectory of the intake manifold pressure to be more accurately predicted, allowing more accurate prediction of the cylinder inducted air mass. More accurate air charge estimation results in a cylinder air-fuel ratio more closely matching the desired air-fuel ratio, minimizing variations in the chemical species products of combustion. This improves fuel efficiency and has the potential to facilitate the use of smaller catalytic converters with corresponding cost savings.

Figure 3:
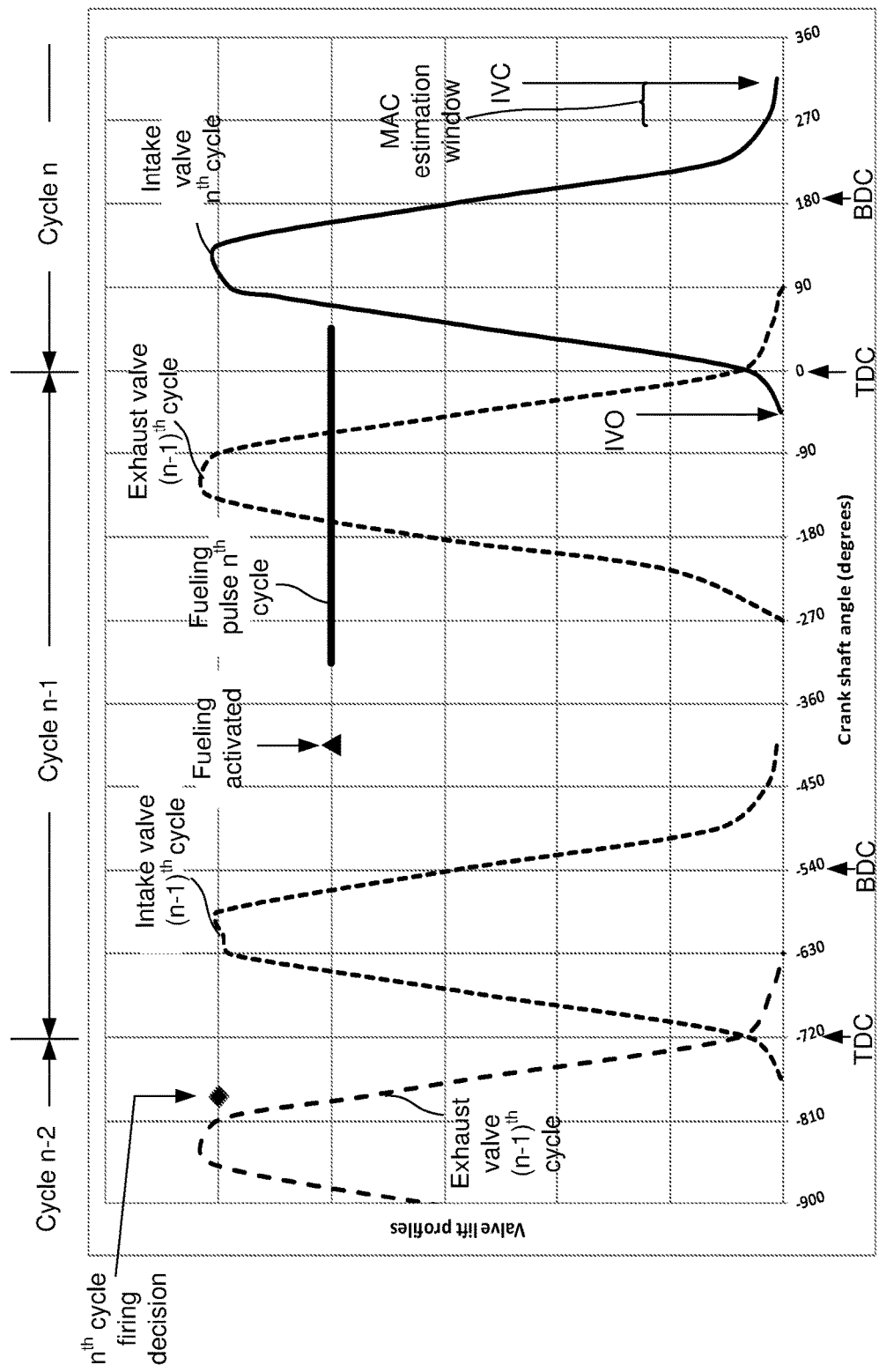
FIG. 3 shows an exemplary timing diagram illustrating timing of firing decisions, valve actuations, and fuel injection.

FIG. 3 illustrates the relative timing of various control and actuator events that can occur in a dynamic skip fire (DSF) engine control system. Shown here are exemplary pulses for fuel injection, lift profiles for the intake and exhaust valves, and timing of the firing decision. This figure depicts one full engine cycle, denoted as the $(n-1)^{th}$ cycle and portions of the $(n-2)^{th}$ and $n^{th}$ cycle. The $n^{th}$ cycle starts at a top dead center (TDC) crank orientation and corresponds to 0° of crank angle. The decision on whether to fire on the $n^{th}$ cycle must be made prior to the start of the $n^{th}$ cycle. In this example, that decision is made at approximately 785° of crank angle prior to the start of the $n^{th}$ cycle. This lead time is required to implement the firing decision. For example, in the case of cam operated valves with a "lost-motion" valve lifter, the hydraulic activation/deactivation system needs time to open an oil control valve and to build hydraulic pressure to move a spring-loaded mechanical lock into position, which then allows the lifter to transfer mechanical motion of the cam to the intake valve. Fueling will also change depending on whether the $n^{th}$ cycle is a skip or fire. Since in this case a decision to fire has been made, the cylinder needs to be fueled. The fueling subsystem is given the command to fuel and the fuel pulse timing parameters at approximately 405° of crank angle prior to the start of the $n^{th}$ cycle. The actual fueling pulse extends from approximately −315° to +45° of crank angle relative to the start of the $n^{th}$ cycle. Note that in the illustrated embodiment, the fueling parameters for the $n^{th}$ cycle need to be defined prior to the start of the $n^{th}$ cycle and the $n^{th}$ cycle intake valve opening.

Also labeled in FIG. 3 are IVO and IVC locations for the $n^{th}$ cycle. These occur at approximately −45° and 315° of crank angle for IVO and IVC, respectively. The time window where the MAP most closely correlated with the $n^{th}$ cycle MAC occurs during the period in which the intake valve is open. That is, between IVO and IVC. More specifically, in the illustrated embodiment, the MAP that is most relevant to the MAC calculation tends to be in the latter portion of the intake valve opening, particularly in a timing window 0° to 40° prior to IVC, around 290° of crank angle in this case. It should be appreciated that the values given in FIG. 3 are exemplary only and they can change significantly based on factors such as the engine architecture and current operating conditions. In particular, the fuel injection window shown is appropriate for a port fuel injected engine. Direct fuel injected engines would have a later injection window.

Once a decision to fire has been made it is necessary to estimate the MAC associated with the firing. Accurate knowledge of the MAC is important to control the fuel/air ratio, which is generally held at or near a stoichiometric ratio for engines with conventional 3-way catalyst, or an optimum lean value for engines with a lean aftertreatment system. Once the MAC is estimated the mass of injected fuel can be determined to yield the desired combustion stoichiometry.

Figure 4:
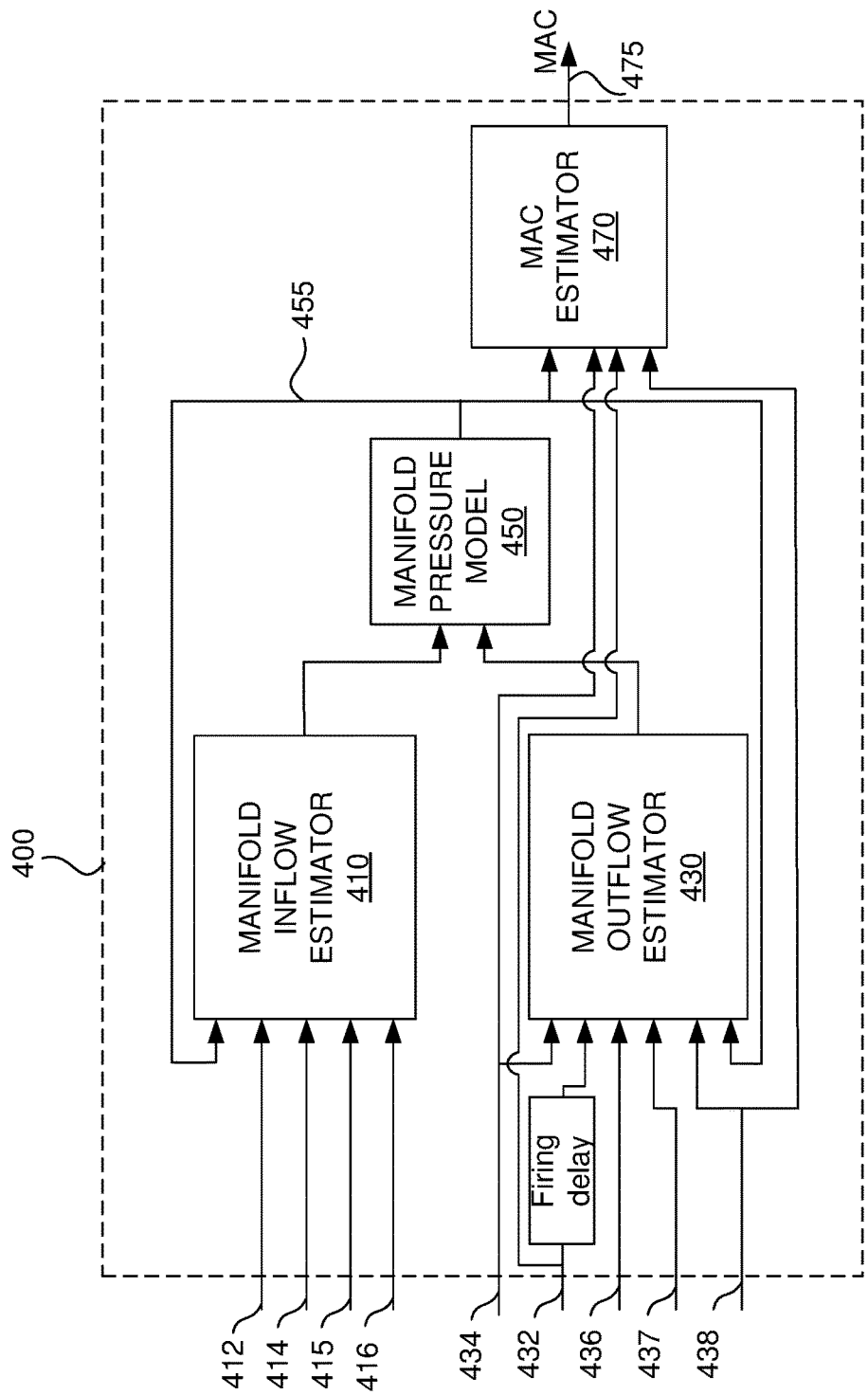
FIG. 4 is a block diagram illustrating an air charge estimator that includes a manifold model with time alignment of firing decision inputs according to an embodiment of the present invention.

FIG. 4 is a schematic view of a model-based MAC estimation system 400 according to an embodiment of the present invention. The MAC estimator may use an intake manifold inflow model 410 having as inputs throttle position 412 along with various measured or estimated signals from inlet and manifold sensors or estimators, such as inlet air pressure 414 and inlet air temperature 415. In some embodiments, additional inputs 416 may be used such so that intake manifold inflows from an exhaust gas recirculation system, exhaust gas backflow (intake valve venting exhaust gases into the intake manifold), or boost levels from a turbocharger or supercharger may be calculated. In other embodiments inputs from a mass airflow (MAF) sensor (not shown) may be used in addition to or in place of one or more of the other inputs.

The MAC estimator 400 may also include a manifold outflow model 430 which includes inputs such as firing decisions 432, cam phases 434, engine speed 436, intake manifold temperature 437 and other variables 438 as appropriate for the model used. Other variables may include the firing history of the cylinder in question, since this influences the cylinder air charge as described in U.S. patent application Ser. No. 13/843,567, which is incorporated herein by reference. Key to the prediction of MAC is the fact that firing decisions are known in advance, both for the cylinder in question and for all cylinders that have a firing opportunity between the firing decision point and IVC of the cylinder in question. Thus, irregular intake manifold outflows caused by skip fire operation can be modeled.

Outputs of the intake manifold inflow estimator 410 and intake manifold outflow estimator 430 can be input into an intake manifold pressure model 450, which is arranged to predict the manifold pressure on an individual cylinder working cycle basis. That is, for each cylinder working cycle/firing opportunity, the intake manifold pressure model predicts the manifold pressure a time in the future corresponding to that working cycle's potential intake event (potential intake event because if the working cycle is skipped, the cylinder may not have an associated intake event during that working cycle). The output of the manifold pressure model is the estimated manifold pressure 455 which may be fed back to both the inflow estimator 410 and outflow estimator 430. The estimated manifold pressure 455 is also input into a MAC estimator 470 which is configured to determine the mass air charge (MAC) 475 for each induction event on an individual cylinder by individual cylinder basis.

Other inputs into the MAC estimator 470 may include the firing decision 432, the cam phase angle(s) 434, and other inputs 438 relevant to the MAC calculation. The intake cam phase angle determines IVO and IVC timing and thus the appropriate time window for the MAP value to be used in a MAC calculation. The exhaust cam phase angle determines possible overlap in intake/exhaust valve opening, which may influence fresh charge flow into the cylinder. Any suitable MAC estimator may be used. For example, MAC estimator 470 may utilize a conventional speed density MAC calculation. By way of example, one suitable speed density calculation utilizes engine speed, intake port temperature, cam phase, and exhaust pressure as its input variables. The output of the MAC estimator 470 is an estimated MAC value 475, which may be input into the fueling algorithm of an ECU, power train controller or other type of engine controller.

In the embodiment described above, the future air charge is predicted in a model based manner using an intake system model with not only the conventional predicted inputs, but the already-decided future individual intake valve decisions so that a time aligned prediction is achieved. Since in the case of the timing diagram of FIG. 3 the firing decision is made at −785° of crank angle, the future state of the intake valve of this cylinder is known, or can be reasonably estimated if the cam phase is changing, at the time the firing decision is made. Thus this information, as well as that of cylinders prior in the firing order whose intake events will occur between −785° and 0° of crank angle, is available to predict the future trajectory of the MAC influencing variables in advance of the time that MAC estimation occurs.

Some of the inputs to the MAC estimator can be predicted based on the current behavior of an actuator. For example, a throttle or cam phaser possesses mass and according to Newton's first axiom of motion an object in motion tends to stay in motion. Therefore the current and past trajectory of the actuator (e.g. throttle position vs time) can be used to predict its future trajectory.

In other cases, the reference inputs to the closed loop controllers for subsystems are also known in advance, such as target cam phases, target throttle position, target waste gate positions or target turbocharger variable geometry turbine positions. Knowing the dynamics of the closed loop systems, such as the controller algorithm and plant model, temporal changes in the model inputs can be predicted.

Figure 5:
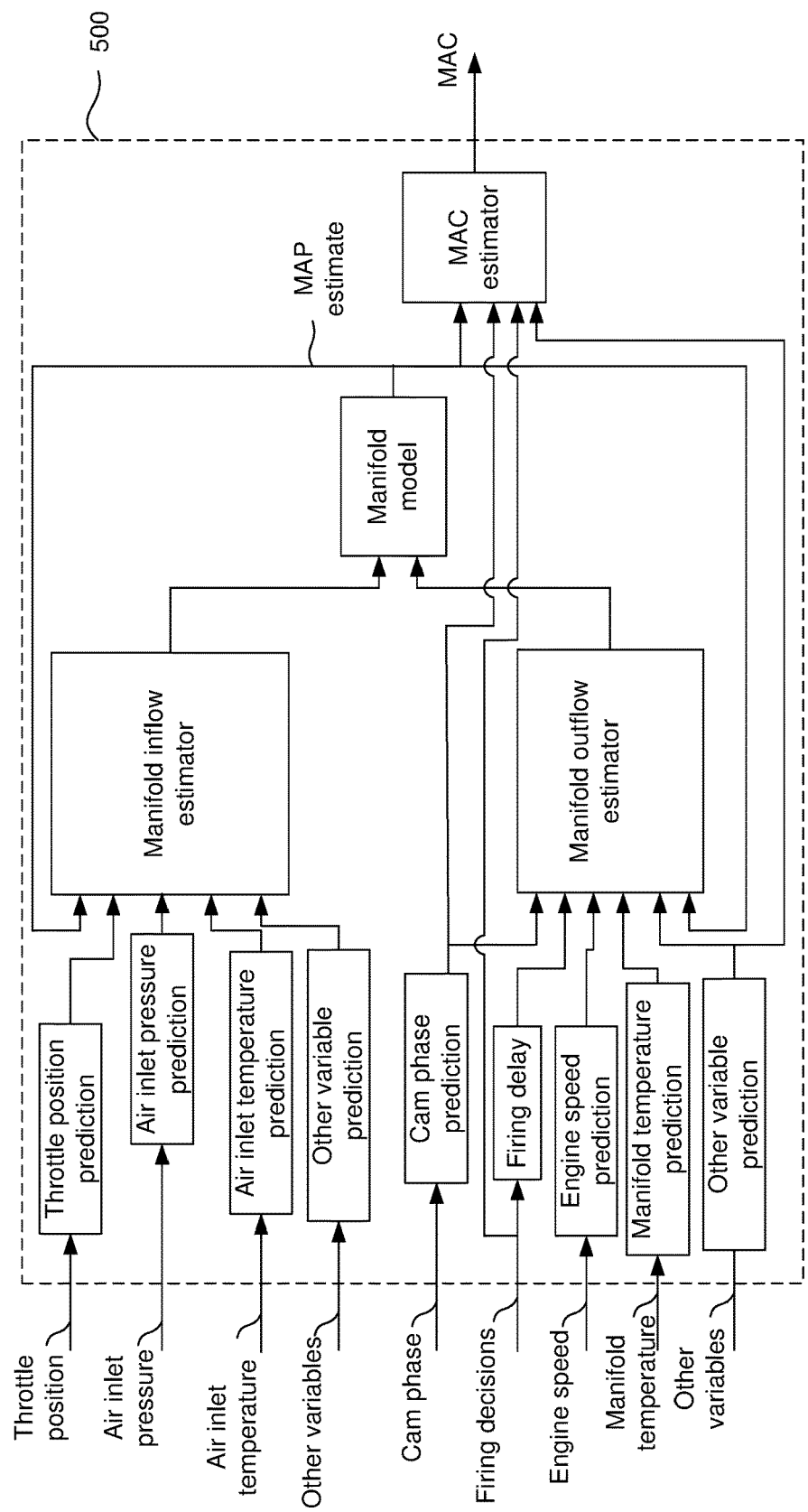
FIG. 5 shows an air charge estimator block diagram including prediction of several inputs according to an embodiment of the present invention.

FIG. 5 indicates an alternative embodiment of a MAC estimator. This MAC estimator 500 is similar to that shown in FIG. 4 and its overall description will not be repeated. In FIG. 5, unlike FIG. 4, prediction of the future state of inputs is explicitly incorporated. Thus anticipated or estimated changes in any of the input variables can influence the output MAC. It should be appreciated that both FIG. 4 and FIG. 5 depict possible embodiments of a control system. A control system with similar functionality may be implemented in different ways or may combine or separate the various functions in a different manner. It should also be appreciated that not all inputs may be required in all cases and additional inputs may be necessary depending on the engine architecture. It should also be appreciated that not all inputs to the model need to be predicted. Thus, in many instances using then-current measurements for some or all of the various model inputs (other than inputs directly based on the firing decisions) provides significantly better estimates than traditional MAC modeling approaches.

Once the MAC for the firing cylinder is determined, the appropriate injected fuel mass can be readily calculated based on the desired combustion air-fuel ratio. The required prediction horizon for fuel injection is dependent on the control software architecture as well as fuel injector characteristics. Fuel injection may require many crank angle degrees to execute, particularly for port fuel injection at high engine speed. Even for direct injection, fueling may be started prior to IVC. The closing of the working chamber intake valve will occur many crank angle degrees later than when an estimate of air charge is needed in order to program the fuel injector driver. Timing and duration of the fuel injection pulse is typically implemented with a dedicated timing peripheral integrated into the microcontroller unit of the ECM such as a TPU (time processor unit). If the MAC is not accurately determined the amount of injected fuel may be incorrect for the desired cylinder air-fuel ratio.

While predictions can be made regarding the actuator positions and engine parameters, there is inevitably some discrepancy between these predictions and the actual positions and parameters. In some embodiments, the MAC estimator 400 or 500 may be utilized one or more times between making an initial MAC estimate at or near the time of the firing decision and a final MAC estimate at or near IVC. The known firing pattern and updated values of actuator positions and engine parameters may be input into the MAC estimator 400 to obtain a successively more accurate MAC estimation.

Figure 6:
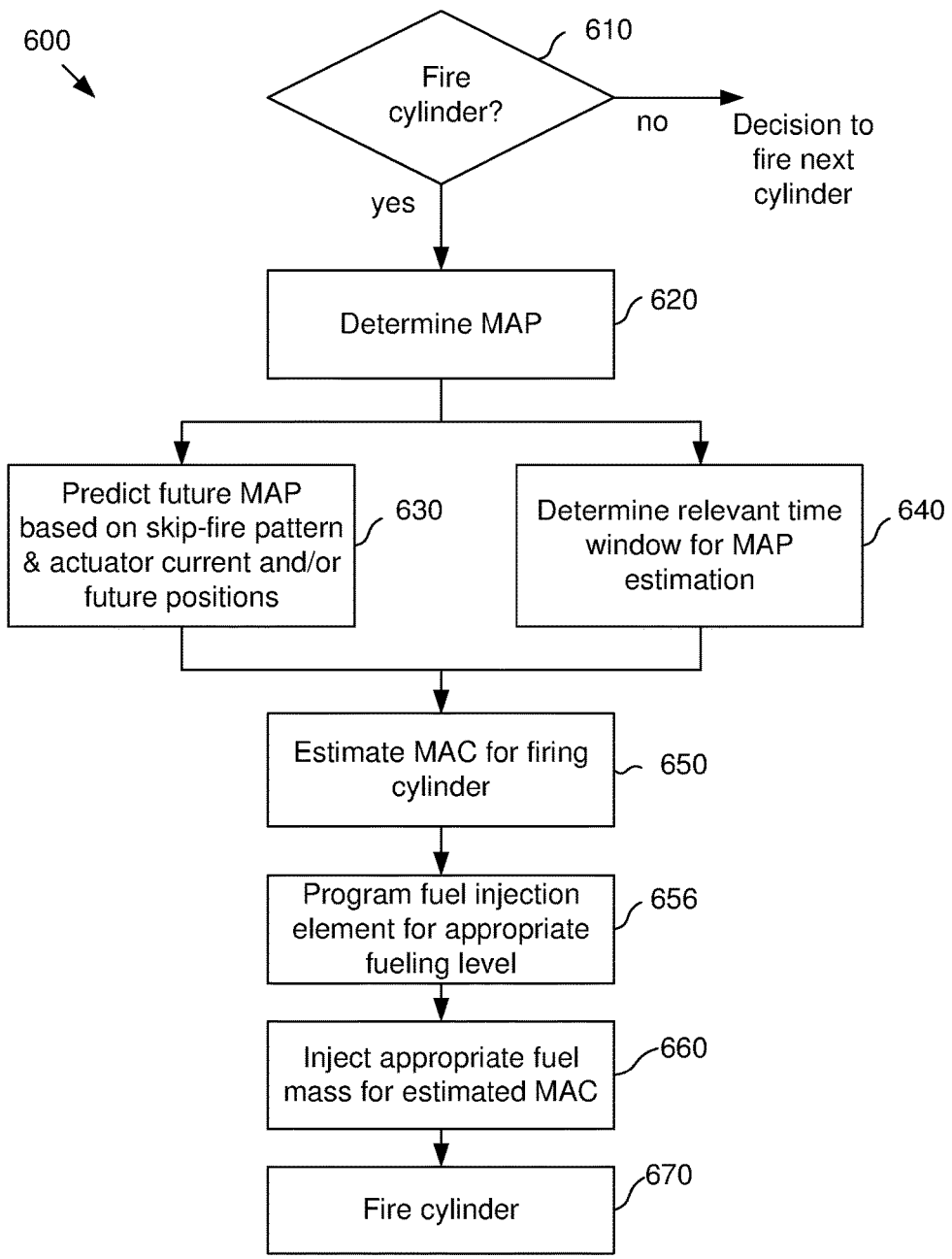
FIG. 6 is a flow chart illustrating a method of determining MAC in a skip-fire controlled engine according to an embodiment of the present invention.

FIG. 6 shows a method 600 of estimating MAC in a skip-fire controlled engine according to an embodiment of the current invention. The method uses an intake manifold flow and pressure model as part of a predictive scheme. If the inputs to the model of the manifold are predicted forward in time, then the MAC output of the model will be predictive and will be accurate to the extent the predicted inputs to the model match the actual trajectory of those inputs.

The method starts at step 610 with a decision to fire a cylinder in a skip-fire controlled engine. If the decision is to not fire, i.e. skip, then the flow method may move directly to the next firing decision, where the method 600 is repeated. If the decision is made to fire, the MAP at the time of the firing decision or soon thereafter is determined in step 620. The determination can be either by a direct measurement, a MAP model, or some combination of the two methods. The MAP determination needs to be made prior to fuel injection for the firing cylinder. A time window for obtaining a MAP estimate is then determined at step 640 based on the opening and/or closing of the firing cylinder's intake valve. The time window is preferably during the last half of the intake valves opening and in particular in a time window 0° to 40° of crank angle prior to intake valve closing.

In step 630 a model predictive of MAP behavior is used to estimate MAP during the time window. In particular, the model includes the impact of any induction events, or skipped induction events, by other cylinders that occur prior to the closing of the intake valve on the firing cylinder. The model may further utilize sensor measurements of the current values of various engine parameters and/or actuators. The model may further estimate how these values may change between the initial MAP determination and the MAP estimation during the time window. Changes in these values may be used to further refine the MAP estimation. For example, the model may take into account feed forward control on the throttle position to help control the MAP. The model may also include the firing history of the cylinder. The model may further include the firing history of other engine cylinders.

At step 650 the MAC is estimated for the firing cylinder using the estimated MAP in the relevant time window determined in step 640. The MAC estimation must be made prior to determination of the fueling parameters, which occur at step 656. The injected fuel mass may be chosen and programmed into a fuel injection system to provide the appropriate combustion stoichiometry. At step 660 the fuel injection system injects the determined air fuel mass. At step 670 the air/fuel charge is combusted in the fired cylinder. The cycle is then repeated for the next firing opportunity. Each cylinder in the engine capable of skip-fire control may use a control method similar to that shown in FIG. 6. The firing decisions and implementation of those firing decisions for each cylinder are temporally interleaved. That is a decision on whether to skip or fire is made at every firing opportunity. If the decision is to fire, the method 600 or some similar method may be used to determine the MAC and injected fuel mass for that firing. While the method 600 is being implemented on one cylinder, the method may be performed for the engine's other cylinders with a temporal offset.

Figure 7:
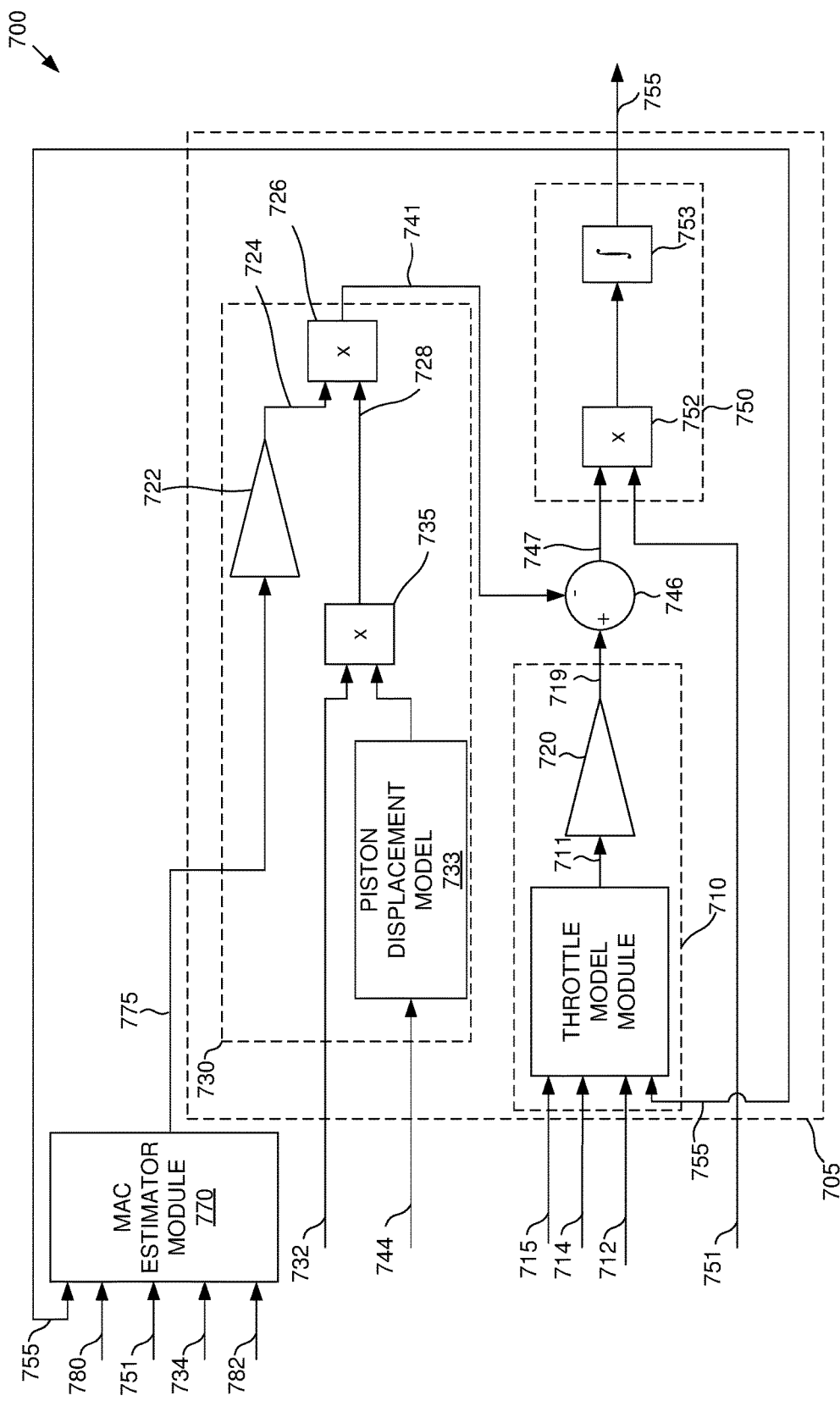
FIG. 7 is a diagram of an air charge estimator in accordance with another embodiment.

Referring next to FIG. 7, an implementation of another mass air charge estimator model 700 will be described. The model 700 is a cylinder volume flow rate model that includes an intake manifold pressure estimator 705. The intake manifold pressure estimator 705 includes a manifold inflow estimator 710 and a manifold outflow estimator 730. The inflow estimator 710 determines a throttle mass flow rate 711 based on the throttle position 712, the pre-throttle air pressure 714 (which may be the ambient air pressure or boosted pressure in a supercharged or turbo charged engine), the pre-throttle air temperature 715 (which may be the ambient air temperature pressure or boosted temperature in a supercharged or turbo charged engine), and the current manifold pressure 755. The throttle mass flow rate 711 is converted to a manifold intake mass flow rate 719 in terms of moles per unit time.

The manifold outflow estimator 730 uses engine crank angle 744 and knowledge of the engine dynamics, together with specific firing decisions 732 and the estimated mass air charge of each fired cylinder 775 to determine an estimated cylinder air usage (manifold out flow) 741, which is also represented in terms of moles per unit time. The manifold outflow estimator converts the per cylinder MAC 775 to a mole per unit volume value 724 using multiplier 722. Mole per unit volume value 724 is one input into multiplier 726. The other input into multiplier 726 is cylinder displacement parameter 728, which represents the volume of inducted gas per unit time. The cylinder displacement parameter 728 is based on a piston displacement model 733, which determines piston position, and thus inducted gas volume, as a function of crank angle 744. The cylinder displacement parameter is the output of the piston displacement model 733 when the firing decision 732 is a fire, which may be represented as a "1" on signal line 732. If the firing decision is a skip, which may be represented as a "0" on signal line 732, then multiplier 735 causes cylinder displacement parameter 728 to remain zero.

The manifold intake flow 719 and the out flow 741 are combined by summer 746 which provides a net manifold molar flow rate 747 (with the out flow being a negative number). Manifold model 750 scales the molar flow rate based on the cylinder intake port temperature 751 using multiplier 752 and converts that value to a pressure change rate which may be integrated by integrator 753 to determine the estimated manifold pressure 755. The estimated manifold pressure 755 is then used by MAC estimator module 770 in the estimation of the mass air charge 775 used in each specific induction event.

A variety of different estimation models may be used by MAC estimator 770. In the illustrated embodiment, a speed density calculation is used which utilizes engine speed 780, intake port temperature 751, intake cam position 734, exhaust pressure 782 and the estimated manifold pressure 755.

It should be appreciated that the described approach compensates for the effect of specific firing decisions by subtracting the mass of air extracted from the manifold in conjunction with each induction event. The mass air charges 775 associated with induction events are individually calculated on an induction event by induction event basis so that the mass air charge calculation accounts for the variation in the air charges associated with different induction events that tend to occur as part of skip fire operation of an engine. These air charge estimates, in turn, are used in the estimation of the manifold pressure 755 which provides a better estimation of the manifold pressure at different times, which may vary significantly between firing opportunities due to the effects of specific fire and skip (no induction event) decisions.

Figure 8:
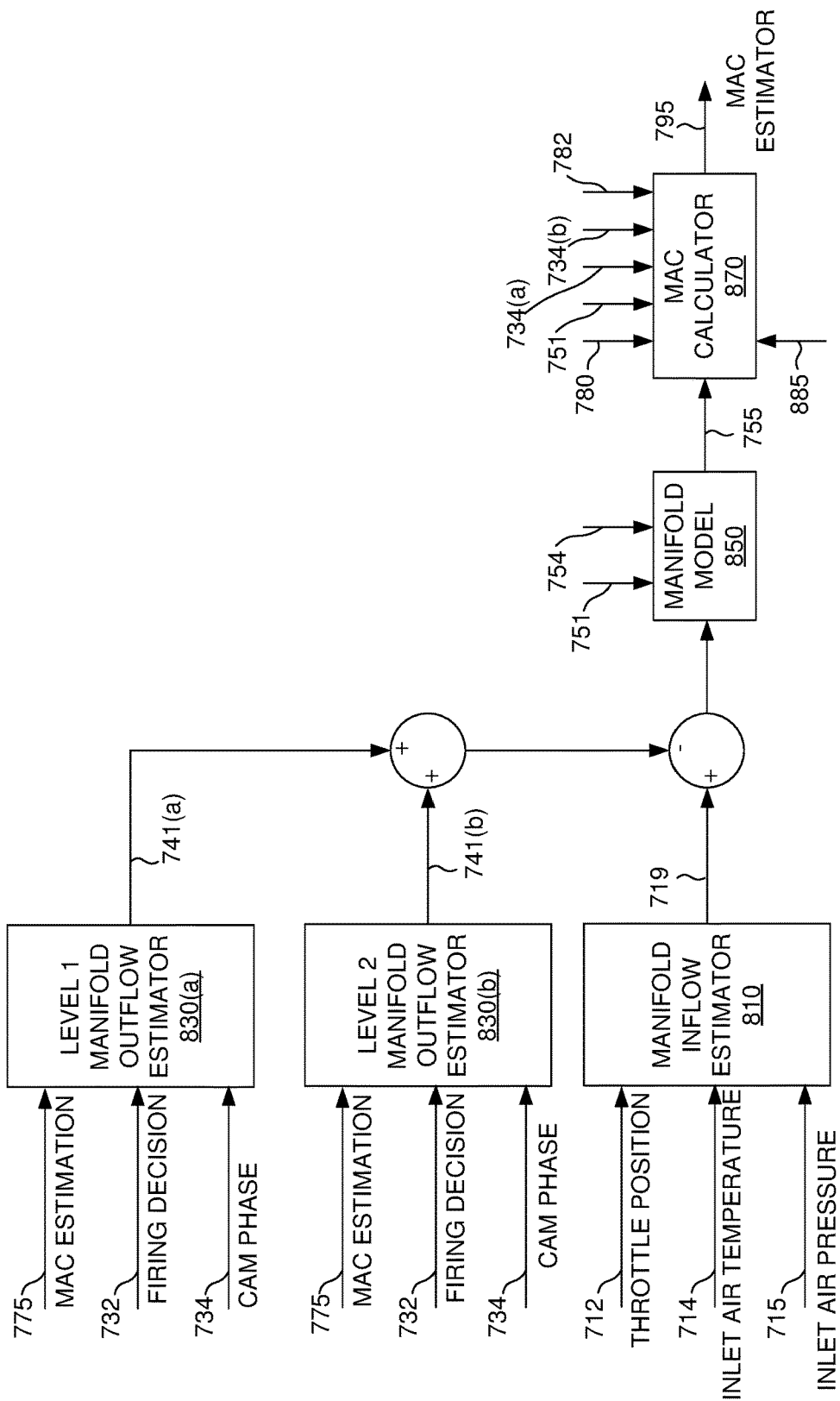
FIG. 8 is a diagram of another air charge estimator suitable for use in conjunction with multi-level skip fire operation.

Referring next to FIG. 8, a variation of the previous embodiments is illustrated which provides an alternative embodiment suitable for use with multi-level skip fire and/or dynamic multi-charge level engine operation. The illustrated MAC estimator model 800 is quite similar to the previously described embodiments except that it includes redundant manifold outflow estimators 830(*a*) and 830(*b*) with each outflow estimator being associated with a different available firing level in the current operational state. If more than two firing levels are supported in a particular state, than an additional outflow estimator 830 would be provided for each supported level. The manifold inflow estimator 810, the manifold model 850, and the MAC calculator 870 may all be otherwise similar to the corresponding components described in any of the previous embodiments, with the differences being that the MAC calculator must account for the level of the induction event. Thus, the MAC calculator may take the cam state associated with each level as a separate input with the firing decisions to determine which level to use in conjunction with each particular induction event.

The manifold outflow estimator architecture illustrated in FIG. 8 can be used to calculate the intake manifold outflow for both multi-level skip fire and multi-charge level engine operation in which all the cylinders are fired, but individual working cycles are purposely operated at different cylinder output levels. Thus, it should be appreciated that the various estimators described are well suited for use in estimating air charge any dynamic firing level modulation engine operation.

The MAC estimators described in FIGS. 4, 5, 7, and 8 all use a MAP value, either measured, predicted, or both, to assist in MAC determination. In some embodiments, a predictive model of MAP behavior may be applied iteratively on a cylinder event (firing opportunity by firing opportunity) basis to provide an increasingly accurate estimation of MAC of a selected working cycle as the selected cycle draws closer to execution. Such refinement of the MAC estimation has several advantages. In general, the MAC estimate may be used in a variety of different control schemes—however, the time that the estimate is needed may vary significantly between the different applications. Iteratively refining the estimate allows the best possible estimate to be used at the time that it is needed. For example, an early estimation of the MAC may be needed for use in a torque model (e.g., the MAC estimation may be needed several crankshaft revolutions before the working cycle corresponding to a particular firing decision begins). In contrast, the fuel charge determination (which needs a precise air charge estimate for best performance) may not be made until close to the time of IVC in some direct injection engines (i.e., after the corresponding working cycle has begun). In this example, the fuel charge determination can utilize a more refined estimate of the MAC, which facilitates improved fuel economy and improved emission characteristics. Of course, the MAC estimate may be utilized by a variety other systems and controller, each of which is able to work with the best possible estimate at the time that the MAC estimate is needed.

Figure 9:
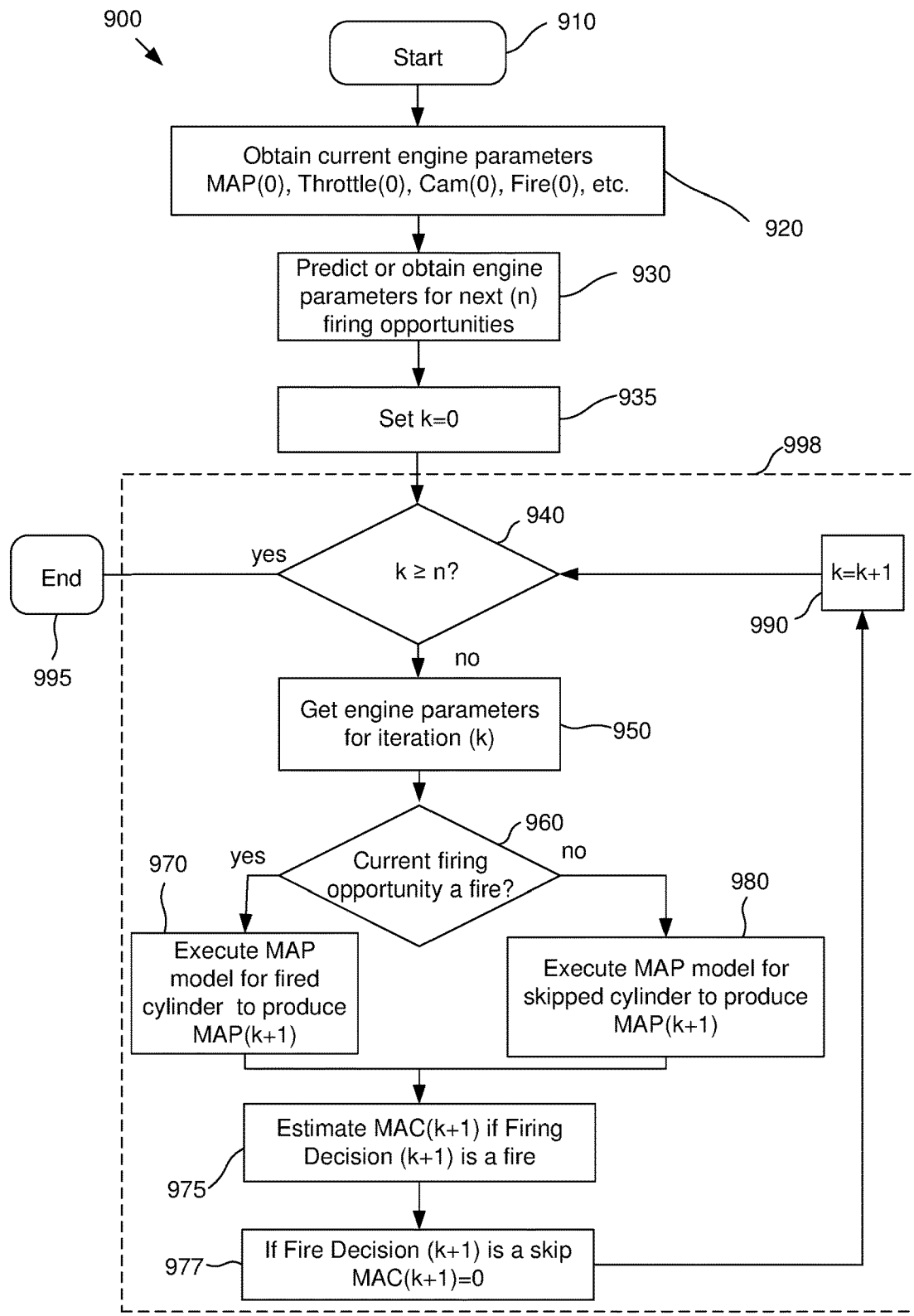
FIG. 9 is a flow chart illustrating a method of providing successively improved estimations of MAC in a skip-fire controlled engine according to an embodiment of the present invention.

FIG. 9 is a flow chart illustrating a representative method 900 of providing successively more accurate MAP and MAC estimates in a skip-fire controlled engine according to an embodiment of the present invention. The method 900 may start or be triggered by a cylinder firing decision at step 910. The illustrated algorithm is preferably repeated each cylinder event (firing opportunity) or more frequently.

Initially, the current value of the engine parameters that are relevant to the MAP and MAC estimation, such as current MAP, cam phase, throttle position, exhaust gas recirculation valve position, etc., are obtained or determined at step 920. The determination may be based on sensor data, actuator inputs, models, or various combinations thereof. These values may be arranged in a data array, which is associated with a time or firing opportunity when the array elements were determined. In a particular implementation, the initial values of the parameters P(0) may include the present manifold pressure [MAP(0)], the present throttle position [Throttle(0)], the present firing decision [Fire(0)] and the present CAM position [CAM(0)] are identified at step 920.

Flow chart 900 then proceeds to step 930 where predictions are made for what the values of the relevant engine parameters will be for each of "n" subsequent firing opportunities, with "n" representing the number of potential intake events that will occur from the present time until the intake event associated with the last firing decision to be modeled (e.g., until the intake event associated with the latest firing decision).

In some embodiments, the relevant engine parameters may include the predicted throttle position at each iteration [Throttle(1:N)], the firing decisions associated with each intervening firing opportunity/iteration [Fire(1:N)] (which is known), and the predicted cam position for each iteration [Cam(1:N)]. The present MAP is used as the initial value MAP value [MAP(0)].

At step 935 a counter k, is initialized to zero. The logic then proceeds to step 940 where the value of the counter, k, is compared with n, the number of firing events between the firing decision, where flow chart 900 was initiated, and execution of that decision. When the counter is less than n, the method proceeds to step 950. At step 950 the model parameters associated with the current iteration (k) are obtained (e.g., throttle(k), cam(k)) etc.) for use as inputs into the MAP model for the current (k) iteration.

In step 960 a determination is made whether the current firing opportunity to be simulated is a skip or a fire. The appropriate model (fire or skip) is then used to predict the next MAP, which is saved but also used to calculate a predicted MAC if the opportunity was a fire. More specifically, when the current firing opportunity is a fire, the logic proceeds to step 970 where the fired cylinder MAP model is executed using the parameters for iteration (k) (using the parameters referenced in step 950) to determine a predicted MAP for the next iteration [MAP(k+1)]. The specific MAP model employed can vary widely based on design goals and computational capabilities of the processor executing the MAP model. By way of example, the MAP model may utilize continuous time integration (as in some of the examples above), Runge Kutta integration (which is less computationally intensive), or other appropriate methods. After the MAP(k+1) is estimated, it is saved for use in subsequent iterations.

If back in step 960 the current firing opportunity is a skip, then the logic flow proceeds to step 980 where the skipped cylinder MAP model is executed to determine the MAP for the next iteration [MAP(k+1)].

After MAP(k+1) has been calculated, the corresponding MAC(k+1) can be calculated if firing opportunity (k+1) is a fire as represented by step 975. Of course, the MAC associated with any skipped working cycle that does not include an induction event will be zero as represented by step 977. At this stage, both the predicted MAP and MAC for cylinder event (k+1) are known. This predicted MAP may then used in the calculation of the MAP and MAC for the next following cylinder event. More specifically, in the context of the flowchart 900, the value (k) is indexed in step 990 and the loop 940-990 is repeated until the MAP and MAC have been calculated for all of the cylinder events of interest—which is represented by (k) equaling (n) in step 940, wherein the process ends.

As suggested above, the described process is repeated for each cylinder event (firing opportunity). This has the effect of updating the MAP and MAC calculations for all of the cylinders of interest with the latest information every firing opportunity. These values can be used by the ECU, skip fire controller and/or other controllers and processes in their respective calculations whenever needed with the assurance that the values being used are the best MAC or MAP estimates available at that time. Additionally, the ECU may use the estimated MAP or MAC data, in conjunction with other measurements, such as readings from an oxygen sensor in the exhaust stream, to provide engine diagnostics and improve the MAC and MAP models.

It should be appreciated that the order of steps and function of steps may be altered or reconfigured in many ways, while retaining model central features of iteratively executing a MAP and MAC model to provide increasingly accurate MAC estimates and using the known skip/fire pattern as an input to or part of the model. While the loop in flowchart 900 has been described as being executed for every firing opportunity in some embodiments, the loop 998 could be executed at regular time or crank angle intervals with appropriate scaling adjustments to the loop counter k appropriately. Flow chart 900 may also be readily modified for dynamic firing level modulation by adding different paths in the loop 998 associated with different cylinder output levels or deleting the path associated with a skipped firing opportunity.

Many of the embodiments described above refer to using intake and exhaust cam phases as inputs to the manifold outflow estimator. Cam phase is an appropriate input for many outflow estimators because cam phasers are commonly used to regulate the timing of the valve openings and closings. However, it should be appreciated that other hardware can readily be used to control the air charge inducted into any particular cylinder. For example, engines that have variable valve lifters can alter the air charge by varying the valve lift. In embodiments in which variable valve lifters are utilized, the position of the lifters will typically be an input to both the manifold outflow estimator and the MAC calculator in addition to the cam phases (if cam phase control is also provided) or instead of the cam phase (if separate cam phase control is not provided). In other embodiments, electromechanical actuators (e.g. solenoids) may be used to operate the valves and in such embodiments, the relative timing of the opening and closing of the valves is important to the manifold outflow estimator and the MAC calculator and therefore would be provided as inputs to those components. More generally, it should be appreciated that whatever actuators are utilized to actuate the intake and exhaust valves, the relevant parameters regarding the particular actuator(s) used may be used by the manifold outflow estimator and MAC calculator/estimator.

In the SAE paper referenced above, two types of firing history are described. The first, is referred to as order history. The order history tracks what the firing sequence is for all of the cylinders. For any particular working cycle, the order based firing history relevant to that working cycle will be indicative of what occurred in the sequence of immediately preceding working cycles of all of the cylinders sequenced in their design firing order. That firing history can be the sequence of skips and fires for a skip fire controlled engine, or when multi-level skip fire or dynamic multi-charge level engine operation is used, it may additionally or alternatively include a history of the relative air charge or power output levels. The models described above work well for accounting for order history induced variations in the air charge.

The other type of firing history is the cylinder history. Each cylinder has its own firing history—which is indicative what occurred in the previous working cycle(s) of that particular cylinder. In general, a cylinder that was skipped in its previous working cycle will be cooler than a cylinder that was fired in its previous working cycle. Also, in an induction event following a skip, the exhaust and intake valves may not be simultaneously open as is typically the case at the beginning of a working cycle for a continuously firing cylinder. Both a lower cylinder temperature and the absence of valve overlap can impact the fresh air inducted into a cylinder following a skipped cycle. The effects of cylinder history can be incorporated into the air charge model as well. By way of example, in any of the described embodiments, the effects of cylinder firing history can be incorporated into the MAC estimator (and thus the manifold outflow estimator), such as the speed density based MAC estimator 770 described with reference to FIG. 7. In some implementations, the intake port temperature estimate used in the MAC estimator is based on the firing history to account for the temperature effects that result from specific skip/fire decisions within that cylinder. In general, whether the cylinder was skipped or fired in the immediately preceding working cycle in the cylinder has the greatest impact on the MAC for a particular working cycle, although the impacts of a set of several previous skip/fire decisions corresponding to the immediately preceding set of working cycles/firing opportunities can have noticeable effects.

In some embodiments, the MAC estimator may be configured to make an initial MAC estimate based on the assumption that the cylinder had been fired each working cycle and a variable scaler may be provided to scale the initial MAC estimate to a final MAC estimate based on the cylinder firing history. In such an arrangement, a cylinder firing history based lookup table can be used to determine the appropriate scaling factor for each working cycle. In other embodiments a model may be used to predict cylinder temperature based on the particular cylinder's firing history and any other factors deemed relevant.

The cylinder firing history may be tracked in a wide variety of manners. By way of example, some suitable approaches for tracking cylinder firing history are described in U.S. patent application Ser. No. 13/843,567, which is incorporated herein by reference.

The invention has been described in conjunction with specific embodiments, it will be understood that it is not intended to limit the invention to the described embodiments. On the contrary, it is intended to cover alternatives, modifications, and equivalents as may be included within the spirit and scope of the invention as defined by the appended claims. The present invention may be practiced without some or all of these specific details. In addition, well known features may not have been described in detail to avoid unnecessarily obscuring the invention. For example, the concept of intake valve opening and closing has been described in the context of a single intake valve; however, it is well known that a cylinder may use more than one intake valve and the closing time of these valves may be different. In this case, the intake valve closing time may refer to the closing time of a single valve or may be some type of average of the individual valve closing times. Also, the present invention has been described in terms of the induction event occurring at the beginning of a firing working cycle. This is not a requirement. In some embodiments of skip fire control air may be inducted into a cylinder and remain in the cylinder through multiple engine cycles before a spark ignites the air/fuel-mixture. Furthermore, the current invention has been described in terms of each skip having no induction event. This is not a requirement. As described in U.S. Pat. No. 9,328,672 and U.S. patent application Ser. No. 15/009,533, both assigned to Tula Technology Inc. and incorporated herein by reference, in some cases it may be desirable to have an induction event on a skipped cylinder. In these cases, the method described in relation to FIG. 6 may be modified so that step 610 determines whether there is an induction event, rather than a decision to fire. In this situation steps related to determining an appropriate fuel mass and injecting that fuel mass may be omitted from the method.

Although the inventions have been described primarily in the context of estimating air charge during skip fire operation of an engine, it should be appreciated that the various estimators, methods and approaches described are well suited for use in estimating air charge in association with any type of dynamic firing level modulation engine operation.

In accordance with the present invention, the components, process steps, and/or data structures may be implemented using various types of operating systems, programming languages, computing platforms, computer programs, and/or computing devices. In addition, those of ordinary skill in the art will recognize that devices such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

What is claimed is:

1. A method comprising:
   determining that a selected working cycle will be fired during operation of an engine, wherein the firing determination is made before an induction event associated with the selected working cycle begins;
   estimating a manifold pressure at a time corresponding to the induction event associated with the selected working cycle, wherein the manifold pressure estimate accounts for impacts from one or more intervening potential induction events that will occur between the time that the manifold pressure is estimated and the time that the induction event associated with the selected working cycle occurs;
   utilizing the estimated manifold pressure in the estimation of the air charge for the selected working cycle;
   utilizing the estimated air charge in a determination of a desired fuel charge for the selected working cycle; and
   causing the desired fuel charge to be injected for the selected working cycle.

2. A method as recited in claim 1 wherein the air charge estimation is made while operating the engine is a skip fire operational mode.

3. A method as recited in claim 1 wherein the air charge estimation is made while operating the engine in a dynamic firing level modulation mode.

4. A method as recited in claim 1 wherein the air charge estimation utilizes a then current firing history of a cylinder in which the selected working cycle occurs in the determination the mass air charge.

5. A method as recited in claim 1 wherein for each intervening potential induction event that results in an actual intervening induction event, a then current firing history of a working chamber corresponding to the actual intervening induction event is used in the manifold pressure estimation.

6. A method as recited in claim 1 further comprising predicting one or more intake valve cam phases for use in the manifold pressure and air charge estimations, wherein the predicted intake valve cam phase corresponds to a cam phase that is expected at the time of the induction event associated with the selected working cycle, and wherein the predicted intake valve cam phase is at least sometimes different than a current intake valve cam phase at the time the air charge estimation is made.

7. A method as recited in claim 1 further comprising predicting one or more exhaust valve cam phases for use in the manifold pressure and air charge estimations, wherein the predicted exhaust valve cam phase corresponds to a cam phase that is expected at the time of the induction event associated with the selected working cycle, and wherein the predicted exhaust valve cam phase is at least sometimes different than a current exhaust valve cam phase at the time the air charge estimation is made.

8. A method as recited in claim 1 wherein the estimated manifold pressure corresponds to a manifold pressure that is expected at the time of closing an intake valve actuated to facilitate the induction event associated with the selected working cycle.

9. A method as recited in claim 1 wherein the air charge estimation is made in the range of approximately 1080° of crank angle rotation prior to the opening of an intake valve to closing of the intake valve actuated to facilitate the induction event associated with the selected working cycle.

10. A method as recited in claim 9 wherein the air charge estimation is an initial air charge estimation, which is updated after execution of each of the intervening potential induction events prior to the opening of an intake valve actuated to facilitate the induction event associated with the selected working cycle.

11. A method as recited in claim 1 wherein the air charge estimation is further based in part on whether an exhaust valve that vents the working chamber in which the selected working cycle occurs was actuated in the immediately preceding working cycle in that working chamber.

12. A method as recited in claim 11 wherein the estimated air charge is higher when the exhaust valve that vents the working chamber in which the selected working cycle occurs was not actuated in the immediately preceding working cycle in that working chamber relative to what the estimated air charge would have been if, all other factors being equal, the exhaust valve had been actuated in the immediately preceding working cycle.

13. A method as recited in claim 1 wherein the engine is a piston engine having no more than four cylinders and an intake manifold having a volume not greater than 10 times the displacement of a cylinder.

14. A method as recited in claim 1 wherein the method is repeated for each fired working cycle while the engine is operated in a skip fire or other dynamic firing level modulation operational mode.

15. A method as recited in claim 2 wherein the manifold pressure estimation is made for each working cycle during a period of the skip fire operation and the air charge estimation is made for each fired working cycle during the period of skip fire operation.

16. A method as recited in claim 1 wherein the manifold pressure and air charge estimation is updated after each of the one or more intervening potential induction events until the selected working cycle is executed.

17. A method as recited in claim 16 wherein each updated air charge estimation provides a more accurate air charge estimation for the selected working cycle.

18. A method of estimating cylinder air charge on a cylinder intake event by cylinder intake event basis for an engine during operation of an engine in a dynamic firing level modulation mode in which firing level decisions are made on a working cycle by working cycle basis, the method comprising:
   estimating the inflow of air into an intake manifold;
   estimating an outflow of air from the intake manifold, wherein the air outflow estimate includes, for each of a multiplicity of specific potential cylinder intake events, estimating an amount of air withdrawn from the intake manifold corresponding to that specific potential cylinder intake event, wherein each specific potential cylinder intake event corresponds to an associated working cycle having a corresponding firing level decision and wherein the air outflow estimation utilizes specific firing level decisions or specific cylinder intake decisions in the determination of the amount of air withdrawn from the intake manifold during respective corresponding specific potential cylinder intake events;
   estimating a manifold pressure based at least in part on the estimated air inflow and estimated air outflow; and
   utilizing the estimated manifold pressure in individual estimation of an air charge for each cylinder intake event in a series of cylinder intake events, wherein the estimated manifold pressure is updated for each individual air charge estimation, whereby each of the individual air charge estimations factor the impact of at least one potential cylinder intake event that has not yet occurred but for which the associated firing level decision has been made at the time such individual air charge estimation is made;

utilizing a selected one of the air charge estimations in a determination of a desired fuel charge for a selected working cycle; and causing the desired fuel charge to be injected for the selected working cycle.

19. A method as recited in claim 18 wherein the air charge estimates are made while operating the engine is a skip fire operational mode.

20. A method as recited in claim 18 wherein the air charge estimates are made while operating the engine in a multi-charge level engine operational mode in which while operating in a particular state, all cylinders are fired but different working cycles are fired at different output levels in an interspersed manner.

21. A method as recited in claim 18 wherein the estimated air charge is determined using a speed density calculation.

22. A method as recited in claim 18 wherein for each cylinder intake event, the mass air charge estimation utilizes a then current firing history of the corresponding cylinder in the determination the mass air charge.

23. A method as recited in claim 18 wherein the estimation of the outflow of the air from the intake manifold utilizes a then current firing history of the corresponding cylinder in the determination of the amount of air withdrawn from the intake manifold for each cylinder intake event accounted for.

24. A method as recited in claim 18, further comprising, for each of at least some of the cylinder intake events:
directly or indirectly utilizing the corresponding estimated air charge in a determination of an amount of fuel to provide for the corresponding working cycle; and
injecting the determined amount of fuel for use in the corresponding working cycle.

25. An engine controller for an internal combustion engine having a plurality of working chambers, each working chamber being configured to operate in a series of working cycles, each working cycle having a potential induction event, the engine controller comprising:
a dynamic firing level modulation controller arranged to determine a firing level for each working cycle;
a manifold pressure estimator arranged to estimate a manifold pressure for a selected one of the working cycles, and arranged to make the manifold pressure estimation (i) before an induction event associated with the selected working cycle begins, and (ii) after the firing level determination is made for the selected working cycle, the manifold pressure estimation being arranged to account for impacts from one or more intervening potential induction events that will occur between the time that the manifold pressure estimate is made and the time that the induction event associated with the selected working cycle occurs, each potential induction event being associated with a different corresponding working cycle;
an air charge estimator configured to estimate an air charge for the selected working cycle based at least in part of the estimated manifold pressure for the selected working cycle;
utilizing the estimated air charge for the selected working cycle in a determination of a desired fuel charge for the selected working cycle; and
causing the desired fuel charge to be injected for the selected working cycle.

26. An engine controller as recited in claim 25 wherein the dynamic firing level modulation controller is a skip fire controller arranged to direct operation of the engine in a skip fire operational mode.

27. An engine controller as recited in claim 25 wherein the dynamic firing level modulation controller is one of:
a) a dynamic multi-level firing controller arranged to direct operation of the engine in a multi-level firing operational mode in which working cycles having at least two different effective displacement levels are interspersed while operating at a given state; and
b) a dynamic multi-level skip fire firing controller arranged to direct operation of the engine in a multi-level firing operational mode in which working cycles having at least two different effective displacement levels and skipped working cycles are all interspersed while operating at a given state.

28. An engine controller as recited in claim 25 wherein the air charge estimator utilizes a then-current firing history of a working chamber in which the selected working cycle occurs in the determination of the mass air charge.

29. An engine controller as recited in claim 25 wherein for each intervening potential induction event that corresponds to an actual induction event, the manifold pressure estimator is configured to use a then-current firing history of a working chamber corresponding to the actual intervening induction event in the manifold pressure estimation.

30. An engine controller as recited in claim 25 further comprising an intake valve cam phase predictor configured to predict an expected intake valve cam phase, corresponding to an intake valve cam phase that is expected at the time of the induction event associated with the selected working cycle for use by the manifold pressure estimator and the air charge estimator.

31. An engine controller as recited in claim 25 further comprising an exhaust valve cam phase predictor configured to predict an expected exhaust valve cam phase, corresponding to an exhaust valve cam phase that is expected at the time of the induction event associated with the selected working cycle for use by the manifold pressure estimator and the air charge estimator.

32. An engine controller as recited in claim 25 wherein the manifold pressure estimator is arranged to estimate a manifold pressure at a time that an intake valve actuated to facilitate the induction event associated with the selected working cycle is closed.

33. An engine controller as recited in claim 25 wherein the air charge estimator is arranged to estimate the air charge in the range of 180° to 1080° of crank angle rotation prior to the opening of an intake valve actuated to facilitate the induction event associated with the selected working cycle.

34. An engine controller as recited in claim 33 wherein the air charge estimation is an initial air charge estimation, which is updated after execution of each of the intervening potential induction events prior to the closing of an intake valve actuated to facilitate the induction event associated with the selected working cycle.

35. An engine controller as recited in claim 25 further comprising a fuel charge estimator, wherein the fuel charge estimator is configured to utilize the estimated air charge in a determination of a desired fuel charge for the selected working cycle, and wherein the engine controller is further configured to cause the desired fuel charge to be injected for the selected working cycle.

36. An engine controller as recited in claim 25 wherein the air charge estimation is further based in part on whether an exhaust valve that vents the working chamber in which the selected working cycle occurs was actuated in the immediately preceding working cycle in that working chamber.

37. An engine comprising:
- an engine controller as recited in claim 25;
- an intake manifold; and
- a plurality of cylinders that receive air from the intake manifold, wherein the internal volume of the intake manifold is no greater than 10 times the displacement of a cylinder.

38. An engine as recited in claim 37 wherein the engine is a four cylinder piston engine.

39. A method of estimating air charge during a selected working cycle during skip-fire operation of an engine, the method comprising:
- making a skip or fire decision regarding all intervening firing opportunities that occur between the selected working cycle and the time of making the air charge estimate; and
- updating the air charge estimate after execution of each intervening firing opportunity, wherein the updated air charge estimate is made using engine parameters associated with the most recently executed firing opportunity; and
- determining an injected fuel mass for the selected working cycle using the estimated air charge determined immediately prior to programming fuel injectors that deliver the injected fuel mass.

40. A method as recited in claim 39 wherein the engine is operating in a dynamic firing level modulation mode with fired cylinders having different cylinder outputs.

41. A method as recited in claim 39 wherein the estimated air charge is determined using a speed density calculation.

42. A method as recited in claim 39 wherein the updated air charge estimate is based on a manifold inflow and manifold out flow model.

* * * * *